G. EASTMAN.
Composition Frame for Hand-Mirrors, Brushes, &c.

No. 203,251. Patented May 7, 1878.

WITNESSES.

INVENTOR.
George Eastman

UNITED STATES PATENT OFFICE.

GEORGE EASTMAN, OF NEWTON, MASSACHUSETTS.

IMPROVEMENT IN COMPOSITION FRAMES FOR HAND-MIRRORS, BRUSHES, &c.

Specification forming part of Letters Patent No. 203,251, dated May 7, 1878; application filed February 11, 1878.

*To all whom it may concern:*

Be it known that I, GEORGE EASTMAN, of Newton, in the county of Middlesex and State of Massachusetts, have invented an Improvement in Composition Frames for Hand-Mirrors, Brushes, &c., of which the following is a specification:

This invention consists in a composition frame for hand-mirrors, brushes, photograph-cases, &c., having a metallic inlay carved or stamped to any desired shape embedded therein under pressure, and united thereto by the same operation that hardens the said composition, as hereinafter more fully explained.

Figure 1:
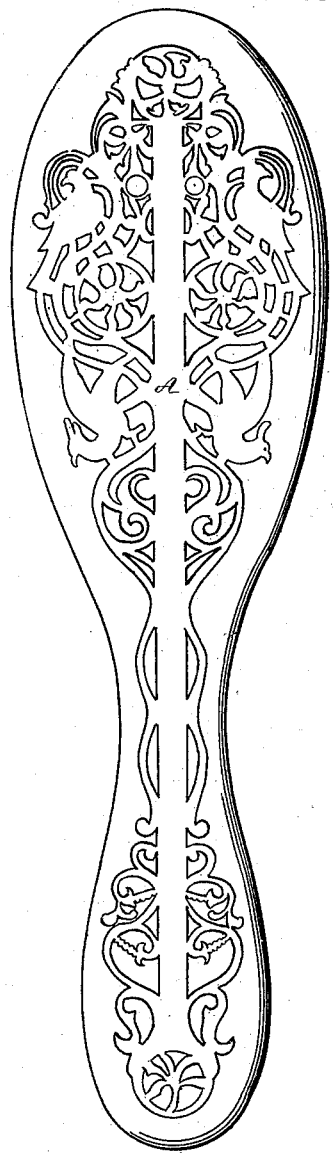
Figure 2:
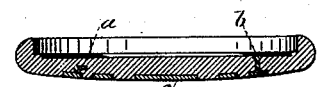

In the drawing, Figure 1 is a plan of the back of a mirror or brush, showing the metal work inlaid in a composition frame, and Fig. 2 is a cross-section thereof.

The inlaid figure A, of any desirable design, carved, stamped, or otherwise shaped from a thin plate or sheet of metal, is placed in the mold for shaping the article to be produced from the plastic composition, with the surface of the inlay immediately adjacent to one of the compressing-dies, the plastic material filling the rest of the mold, and is firmly embedded and fixed in the same by the compression exerted in shaping the plastic material and the operation employed in hardening and setting said material after its shaping.

I provide the under outer edge of the metallic inlay with a continuous projection, $a$, formed thereon, or wire soldered thereto, because the inlay necessarily should be very thin, and requires strengthening along its outer under edge. In order to secure a better and firmer fastening in the material, I further provide the said inlay with projections $b$, which pass well into the material, or may be carried through and clinched upon the under side thereof, as shown.

This process of inlaying a metal design in a composition frame can be carried on with the molds ordinarily employed in shaping formative material or cement into frames for toilet-mirrors, brushes, photograph-frames, &c., so that its introduction to the trade is not accompanied by any expense, saving the cost of shaping the metal designs.

Of course, the metal inlay may be of any desirable conformation or shape suitable to the article which it ornaments; but when the same is in the form of raised ornamentation, the plastic material should be molded around it to form an adjacent surface flush with the surface of the design.

In some instances it may be desirable to provide the inlay A with a continuous or isolated projection, $a$, around which the plastic material is molded, to more securely unite the inlay to the composition. This projection may extend entirely through the frame, and be enlarged on the outer surface, as shown at $b$, Fig. 2, or it may be wholly embedded, as shown at $a$.

Wooden frames for mirrors, brushes, &c., are old, as are also frames molded from cement and other plastic composition; and the invention has for its object merely the inlaying of a metal design or figure into the back, handle, or other portion of a frame for a toilet-mirror, brush, photograph-case, or article of a like nature, molded to shape from a plastic material, when the same is united to said molded article by heat and pressure, and in the same mold that gives the article its shape.

This invention gives a greater scope for ornamentation at a low or moderate price than would otherwise be possible.

I am aware that metal strengtheners have been molded in the dies with the plastic material, for the purpose of giving general stability to the article formed, as described in the patent to Peck, of October 3, 1854, and that to Dudley and Clark of July 27, 1869; but these strengtheners are entirely covered with the composition, and are not used for ornamental purposes.

I am also aware that in marquetry and Buhl work inlays of wood, metal, tortoise-shell, pearl, ivory, &c., are accomplished by cutting out the design or figure and inserting it into a recess of a like shape in the face of the article to be ornamented; but in such work the excavation is first made by a saw or some other tool before the inlay is inserted, while in my invention the inlay itself is compressed into the plastic base, and makes and fills its own recess by the action of the compressing-die.

I am further aware that in papier-maché, lacquer, and other kinds of work the design or figure set therein is first cemented or glued in position on the material, and an adjacent surface formed around it by successive coatings of some filling material, lacquer or varnish; but the same cannot be considered as an equivalent for a process that frames the inlay and completes the article by one and the same act.

I claim—

The combination of a molded plastic material surrounding or partially surrounding metallic ornamental inlays, with said metallic ornamental inlays strengthened around their exterior upon their inner surface by a continuous wire or other continuous projection, and fastened to said molded material by rivets passing through the same and clinched upon the other side, or pins passing well into the material, substantially as and for the purpose described.

GEORGE EASTMAN.

Witnesses:
F. F. RAYMOND, 2d,
A. J. OETTINGER.